United States Patent Office

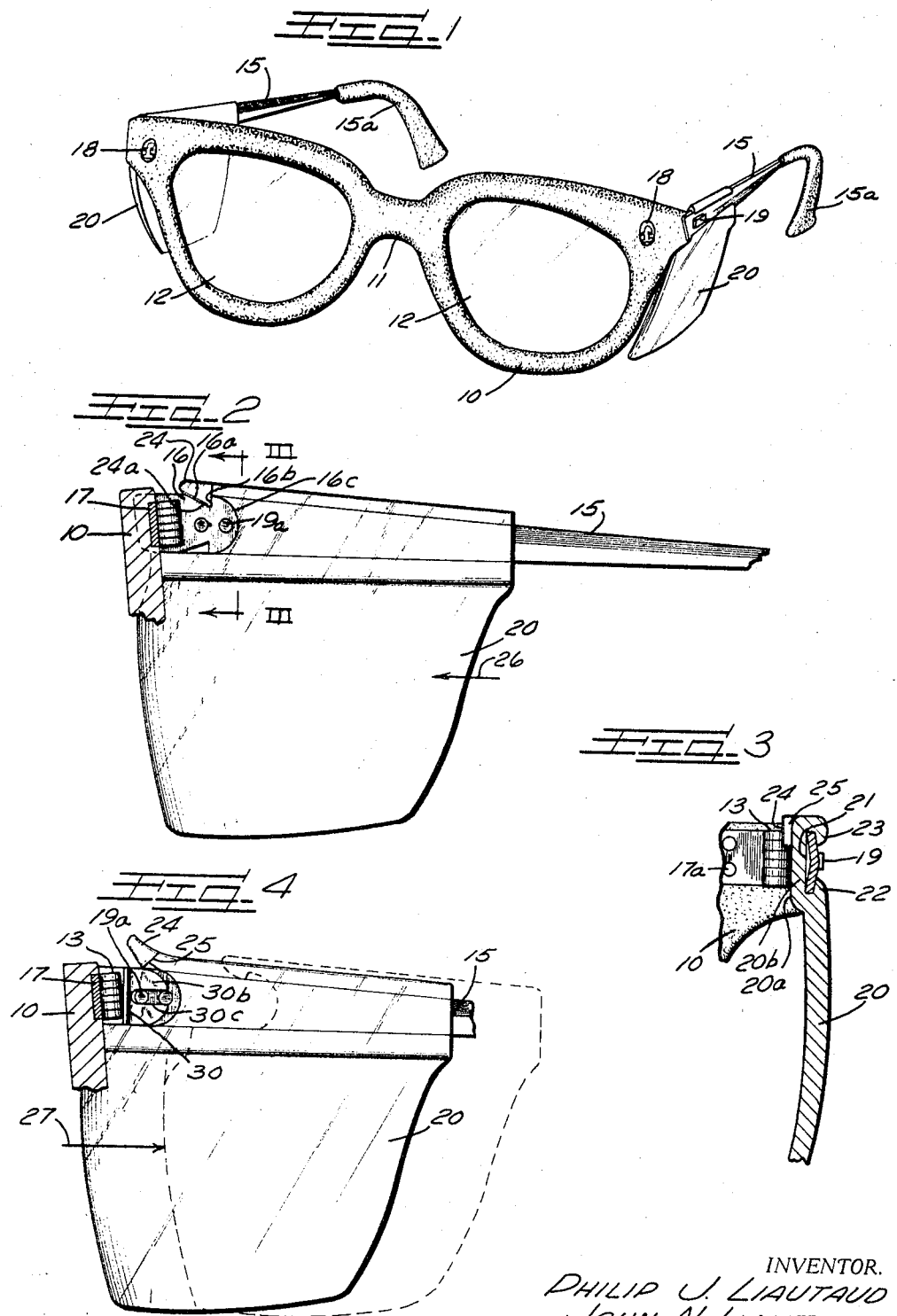

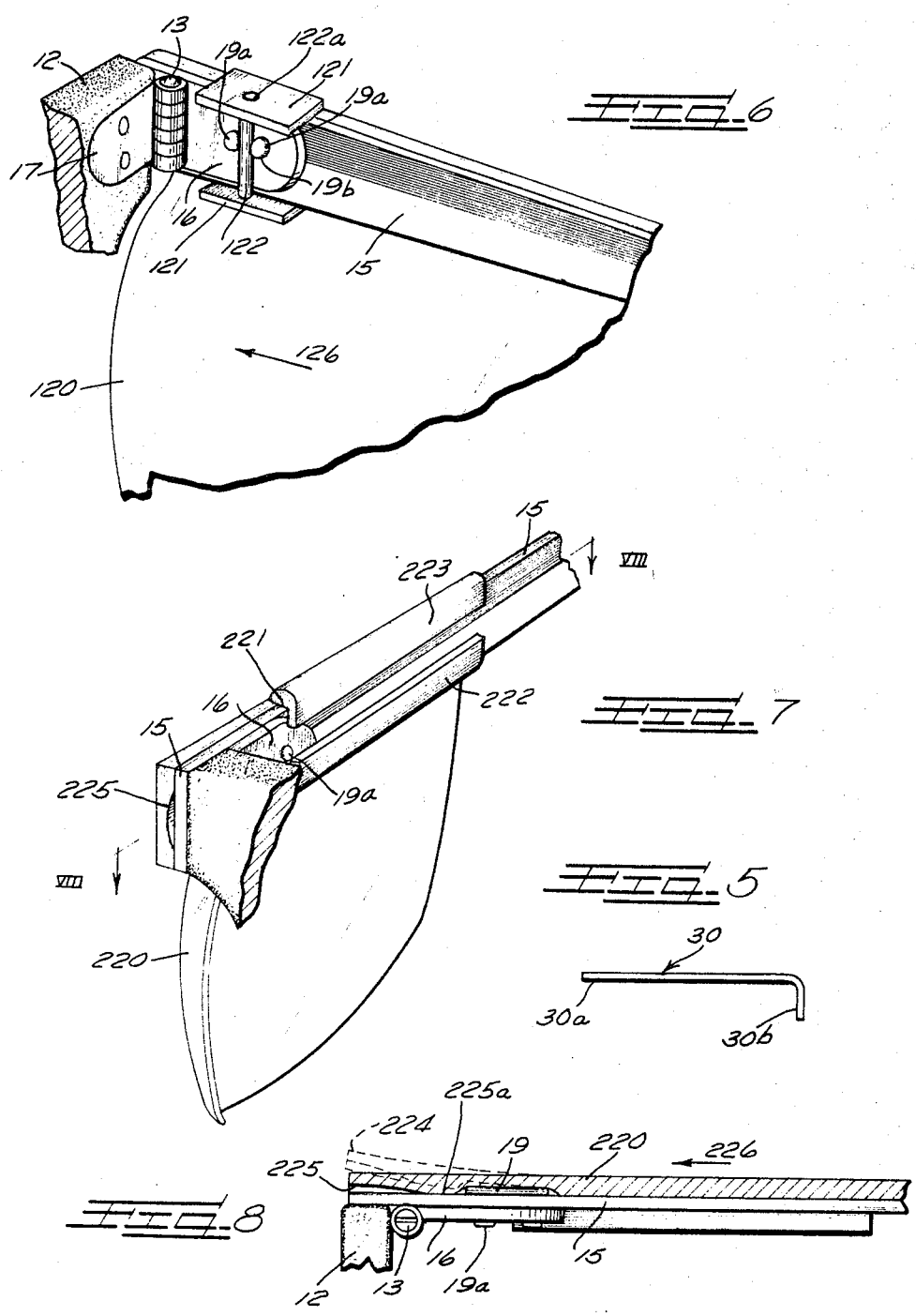

3,436,761
Patented Apr. 8, 1969

---

3,436,761
SIDE SHIELD CONSTRUCTION FOR SPECTACLES
Philip J. Liautaud, Hoffman Estates, John N. Liautaud, Glenview, and Paul D. Amundsen, Wonder Lake, Ill., assignors to Fendall Company, Chicago, Ill., a corporation of Illinois
Filed Feb. 12, 1965, Ser. No. 432,295
Int. Cl. A61f 9/02, 9/06
U.S. Cl. 2—13                            13 Claims

The present invention relates to spectacles and is, more particularly, concerned with the provision of a novel side shield structure readily attachable to the temple of a pair of spectacles. More particularly, the invention relates to a construction of side shield and spectacle temples whereby the side shield may easily be slipped into position upon the temple but may not be readily removed from the temple without special implements.

As those skilled in the art of eyeglass manufacture are aware, side shields have been employed as an accessory to spectacles for many years. Such side shields find many uses, including protection against sun rays in sun glasses, and protection against flying particles as in the case of industrial glasses. Although the side shield construction of the present invention may readily be employed for all manner of purposes, it finds particularly effective utilization in the field of industrial eye protective devices.

Since the introduction, and widespread use, of industrial safety glasses of the type having a relatively stylish configuration, safety glasses have become increasingly widely used. In a majority of instances, such safety glasses need no protection at the side, along the temple. However, in many utilizations, side shields are considered a necessary structure for safety glasses and, accordingly, manufactureres of safety glasses have been required to incorporate special safety glass models in their line of equipment offered for sale to the manufacturing trade. In the past, the practice of manufacturers of safety glasses has been to provide a separate line of safety glasses in which side shields are incorporated as a part of the assembled spectacle. In such cases the side shields have been nondemountable and the issuance of spectacles with side shields has been on a selective basis within a manufacturing facility. This requires that a separate inventory of special, side shield type safety glasses be carried by most manufacturing concerns, even through relatively limited use of a side shield type safety glasses may be made.

The present invention is concerned with the provision of a side shield constructed in a manner to permit its ready assembly to a conventional type of safety spectacle in a manner permitting disassembly of the side shield from the spectacle only by means of special instruments. In accordance with the invention, a spectacle is provided in which the side shields may readily be installed at any time, and removed at any time from the same spectacle employed universally throughout the manufacturing facility. By providing for simple assembly of the side shield onto the spectacle, no special spectacle need be issued to any employee and, at the same time, should his job require side shields, they may be conveniently installed in the field, even at the job site. At the same time, however, since it is human nature to remove the side shields, they are constructed in accordance with the present invention in a manner preventing their removal except with especially designed tools or by means of conveniently available conventional tools with the help of special knowledge of the proper technique of disassembly. By these means, practically complete universality of use is provided for a spectacle of uniform, or standard, configuration.

In accordance with the present invention, side shields of a transparent plastic material are provided. The shield is constructed with a longitudinally extending track or bracket configuration which is constructed to confine the spectacle temple. The track is arranged to permit assembly of the side shield onto the temples by longitudinal sliding of the side shield along the temple into a position immediately adjacent the spectacle frame. Integral detent means are provided on the temple and side shield which co-operate, when the side shield is in its final, adjusted, position immediately adjacent the spectacle frame, to maintain the side shield in that position without interfering in any way with the operation, or folding, of the spectacle. The invention encompasses the various embodiments all of which provide a means for maintaining a side shield in a longitudinally adjusted, assembled, relation to a spectacle frame and temple assembly.

It is, accordingly, an object of the present invention to provide a new and substantially improved spectacle incorporating a side shield.

Still another object of the present invention is to provide a spectacle side shield capable of simple assembly upon a pair of spectacles, and for simple disassembly therefrom only upon the utilization of special instruments.

Yet a further object of the invention resides in the provision of an extremely simple side shield construction for spectacles, in which the side shield may be stocked in limited quantiy for substantially universal adaptation to safety spectacles not already having side shields already in the field.

A feature of the invention resides in the provision of co-operating securing and dentent means on side shields and the related spectacle temples upon which side shields are to be mounted.

Another feature of the invention resides in the provision of extremely inexpensive side shields adapted for use with spectacles at a minimum of expense for installation thereof upon the spectacles or the authorized removal therefrom.

Still another object of the invention is to provide a novel and substantially improved side shield for spectacles or the like, and a co-operating tool for removal of such side shields from the spectacles upon which they are mounted, should the need for such side shields on the spectacles pass.

Still other and further objects and features of the present invention will at once be understood by those skilled in the art from a consideration of the attached drawings wherein several embodiments of the invention are shown by way of illustration only, and wherein:

FIGURE 1 is a generally isometric view of a pair of spectacles incorporating side shields of the present invention;

FIGURE 2 is an enlarged, side-elevational view of the side shield in assembled position upon the spectacles illustrated in FIGURE 1;

FIGURE 3 is a cross-sectional view taken along the line III—III of FIGURE 2;

FIGURE 4 is a side-elevational view of the side shield of the present invention, as shown in FIGUHE 2, except that in FIGURE 4 the side shield is in the process of being removed from its assembled relationship with the spectacle temple;

FIGURE 5 is a side-elevational view of a tool useful in disassembling the side shields of the present invention from the spectacle upon which they are mounted;

FIGURE 6 is an illustration, in isometric view, of a modified form of the present invention;

FIGURE 7 is an illustration, in isometric view, of a further modified form of the present invention; and FIGURE 8 is a plan view, taken along the line VIII—VIII of FIGURE 7, in partial cross-section, illustrating the assembly and removal of a modified form of the side shield of the present invention.

As shown on the drawings:

As may be seen from a consideration of the drawings, a first embodiment of the invention is shown in FIGURES 1 through 5. There, the spectacles to which the side shields are attached are shown in FIGURE 1 as having a frame 10 carrying lenses 12 spaced by a nose bridge portion 11. Temples 15 are secured to the frame 10 by means of hinges 13 secured to the frame and temple by hinge plates 17 and 16 respectively. As in the usual case, the temples 15 are provided with paddles 15a for retaining the spectacles in position on the head of the wearer.

As may be more clearly seen from a consideration of FIGURES 1, 2 and 3, the hinge plates 16 are secured to the temples 15 by means of a plaque 19 secured to the respective plate 16 by means of rivets 19a. Similarly, the hinge plates 17 on the frame 10 are secured to the frame 10 by means of plaques 18 carrying rivets 17a in passing through hinge plates 17.

In the embodiment illustrated in FIGURES 1 through 5, the hinge plates 16 are provided with notches 16a having a retention edge 16b. The hinge plates are, also, rounded at 16c. The notch 16a is provided for co-operation with a projection 24 carried by the side shield 20. Each side shield 20 is provided with a longitudinally extending T-slot or groove 21 having projectng edges 22 and 23 facing each other. In the form illustrated, the temple 15 is tapered and, similarly, the associated side shield 20 is provided with a T-slot 21 of tapered configuration. As thus constructed, the side shield 20 may be laterally assembled to the respective temple 15 by movement of the side shield in the direction of the arrow 26. As the side shield progresses along the temple 15 toward the position shown in FIGURE 2, the projection 24 snaps over the edge 16b of the slot 16a, after having been deflected transversely outwardly by the curved surface 16c. In the embodiment illustrated the side shield is constructed of a clear, or colored, transparent material having substantial stiffness to retain its physical dimensions in ordinary use, but of sufficient resiliency to permit the deflection of the projection 24 above described. In some uses a screen of wire or other material may replace the solid lower portion of the side shield illustrated. In such cases the screen would be embedded, or otherwise secured to the plastic portions of the side shield shield cooperative with the temples.

As shown, the angled surface 24a of the projection 24 readily co-operates with the rounded surface 16c of the hinge 16 so that manual pressure on the side shield 20 is ample to permit assembly of the side shield to the temple in the manner illustrated in FIGURE 2. By providing a slight interference dimensional fit between the tapered groove of the side shield and the tapered edges of the temple, a very tight assembled condition may readily be provided in which the edges of the groove 21 are in tight, resilient, contact with the temple 15. With the parts in this assembled relation, it is practically impossible for a person, without tools, to remove the side shields. This is a desirable feature since it is not intended that persons issued the side shield devices be able to remove the side shields without some difficulty. It has been found in practice that this difficulty aids materially in keeping side shields in position on safety glasses in the field. However, the side shields may readily be removed with a simple instrument in the hands of authorized personnel.

A tool 30 having a lever 30a and a forked end 30b is formed generally in the manner illustrated in FIGURES 4 and 5. The end 30b is provided with a slot 30c which cooperates with the rivets 19a of the hinge plate 16, and the hinge 13 in a manner permitting expansion of the projection 24 of the side shield 20 laterally, as shown in FIGURE 4, to disengage the projection 24 from the notch 16. For this purpose, tne projection 24 extends above the plane surface 20a of the side shield so that contact of the legs 30b of the tool 30 with the projection 24 will be assured even though the thickness of the plate 16 is no less than the thickness of the portion 20b of the side shield. Of course, where it is desired that the thickness 20b of the side shield be substantially in excess of the thickness of the hinge plate 16, the projection 24 need be no greater in thickness than the portion 20b, since the tool is of substantially the same width as the hinge plate 16. As shown in FIGURE 4, upon manipulation of the tool 30 in an arcuate path to cause camming of the projection 24 upwardly, the side shield 20 may be moved in the direction of the arrow 27 and readily removed from the temple 15. In the simple illustration shown, the pins 19a provide a reaction surface for the groove 30c in the tool 30 which supports the tool during its movement causing upward deflection of the projection 24.

As may be seen from a consideration of FIGURES 6, 7 and 8, various other modifications of the present invention may readily be constructed. In the embodiment shown in FIGURE 6, the side shield 120 is provided with flanges 121, either constructed integrally therewith of plastic, or rigidly secured thereto by any conventional means such as riveting or gluing. A pin 122 extends through and between the flanges 121 and is riveted over as shown at 122a. The side shield is then lateraly slitted in the direction of arrow 126 so that the pin 122 snaps over projecting rivet pins 19a into the position of assembly illustrated. If desired, a one-way characteristic may be provided for the assembly of the modified form in FIGURE 6 by providing a wedge ramp surface, as at 19b on the pin 19a, permitting movement of the pin 122 readily in the direction of arrow 126 but providing for more difficult retrograde movement thereof. Removal of the shield 120, in the form shown in FIGURE 6, may readily be accomplished by insertion of a pointed object between the pin 122 and the hinge plate 16, thereby springing the pin 122 outwardly away from the hinge plate 16 permitting it to pass over the pin 19a toward the right, as viewed in FIGURE 6.

In the embodiment of the invention illustrated in FIGURES 7 and 8, the plaque 19 carrying the rivet pins 19a is employed as the detent means for maintaining the side shields 220 in assembled position on the temple 15. As may readily be seen from FIGURES 7 and 8, a T-groove or slot 221 is provided by opposing edges 222 and 223 which act to confine the temple 15. The side shield 220 may be moved in the direction of the arrow 226 into an assembled position manually, during which movement the tip portion 224 is sprung outwardly over the plaque 19 by means of a wedge opening 225. During this assembly position the side shield is flexed, as indicated in the dotted lines in FIGURE 8, and then snapped back into the full line position there shown. In order to remove the side shield, a pointed instrument is inserted into the opening 225, as may be clearly viewed in FIGURE 7, and the side shield flexed into the dotted line position shown in FIGURE 8 at which time the side shield may readily be slipped toward the right, as viewed in FIGURE 8, into the disassembled position.

As a further alternative form, the portion 225a of the plastic side shield may be replaced by a small leaf spring secured to the side shield in the position of 225a and acting as a one-way ratchet. In such an installation the spring can be sprung away from the detent plaque 19 by a tool introduced into opening 225 into contact with the spring.

In all of the embodiments above discussed, it will be seen that with knowledge of the method of assembly and disassembly, the side shields of the present invention may readily be assembled to, and removed from, the temple of a spectacle. Without precise knowledge of the techniques of assembly, however, the average wearer in the field would not appreciate that the side shields are intended for removal and, accordingly, the unauthorized removal of the side shields is minimized.

In the forms illustrated the side shield is shown mainly as a vision protection device. It will be understood, however, that the plastic portion 20a and 222, 223 substantially encircling the metal temple 15 will operate as insulating devices to protect the wearer's head from heat conducted by the temple. In use as a heat insulator only the depending portion of the side shield may be eliminated if desired. In such a case, when the shield is transparent it becomes almost invisible on the temple, and hence will not mar the style of the glasses.

It will, of course, be apparent to those skilled in the art that further variations and modifications may be made in the structure embodying the present invention without departing from the novel concepts herein disclosed. It is, accordingly, our intention that the scope of the present invention be limited solely by that of the hereinafter appended claims.

We claim as our invention:

1. In combination with a spectacle frame having a temple hinged thereto, a side shield deflectable means rigidly attaching said side shield to said temple for movement therewith without tools without apparent means for removal in assembled position thereon unless removed therefrom by the application of a tool, means providing access under said deflectable means, and means providing a complementary reaction surface spaced from said deflectable means to allow application of a deflecting tool between said reaction surface and said deflectable means via said access for deflection of said deflectable means to permit removal of said side shield from said temple.

2. In combination with a spectacle frame having a temple hinged thereto, a side shield means rigidly attaching said side shield to said temple in assembled position thereon for movement therewith, rigid detent means on said temple said side shield having yieldable means thereon co-operating with the rigid detent means on said temple retaining said side shield in fixed position on said temple, means providing access under said yieldable means, and means providing a complementary reaction surface spaced from said yieldable means to allow application of a deflecting tool between said reaction surface and said yieldable means via said access for deflection of said yieldable means to permit removal of said side shield from said temple past said detent means.

3. In combination with a spectacle frame having a temple hinged thereto, a side shield means rigidly attaching said side shield to said temple in assembled position thereon and including rigid detent means on said temple, said side shield having yieldable means thereon co-operating with rigid detent means on said temple retaining said side shield in fixed position on said temple for movement therewith, said side shield comprising a yielding plastic material and said rigid detent means comprising a fixed projecting element on said temple projecting into the path of movement of said side shield toward its assembled position on the temple and co-operating with the yieldable means on said side shield, means providing access under said yieldable means, and means providing a complementary reaction surface spaced from said yieldable means to allow application of a deflecting tool between said reaction surface and said yieldable means via said access for deflection of said yieldable means to permit removal of said side shield from said temple past said detent means.

4. In combination with a spectacle frame having a temple hinged thereto, a side shield means slidably rigidly securing said side shield to said temple for movement therewith without tools and for removal therefrom by the application of a tool for deforming the side shield to initiate retrograde movement along the temple, said side shield comprising a plastic material having a yieldable portion and said temple having a rigid projection thereon co-operating with the yieldable portion of said side shield whereby movement of said side shield into its assembled position causes deflection of said yieldable portion past said projection and whereby removal of said side shield requires deformation of said yieldable portion prior to said retrograde movement, means providing access under said yieldable means, and means providing a complementary reaction surface spaced from said yieldable means to allow application of a deflecting tool between said reaction surface and said yieldable means via said access for deflection of said yieldable means to permit removal of said side shield from said temple past said detent means.

5. In combination with a spectacle frame having a temple hinged thereto, a side shield means rigidly attaching said side shield to said temple in assembled position thereon, rigid detent means on said temple retaining said side shield in said fixed assembled position thereon, and a projection on said side shield co-operatively engaging said rigid detent means deflectable to snap past said detent means readily in the direction of assembly but with great difficulty in the direction of retrograde movement, means providing access under said deflectable projection and means providing a complementary reaction surface spaced from said deflectable projection to allow application of a deflecting tool between said reaction surface and said deflectable projection via said access for deflection of said deflectable projection to permit removal of said side shield from said temple in the retrograde movement direction.

6. In combination with a spectacle frame having a temple hinged thereto, a side shield means rigidly attaching said side shield to said temple in a fixed assembled position thereon and against removal by retrograde movement along the temple, said side shield having a longitudinal C-slot thereon having the head portion thereof constructed to accommodate said temple, and rigid detent means on said temple, the sides of said C-slot being yieldable co-operating with said detent means to retain said side shield in a fixed longitudinal assembled position on said temple.

7. In combination with a spectacle frame having a temple hinged thereto, a side shield means rigidly attaching said side shield to said temple in a fixed assembled position thereon and against removal by retrograde movement along the temple, said side shield having a longitudinal C-slot thereon having the head portion thereof constructed to accommodate said temple, and rigid detent means on said temple, at least one of the surfaces of said slot being yieldable and having a latching surface thereon co-operating with said detent means to retain said side shield in a longitudinally fixed assembled position on said temple.

8. In combination with a spectacle frame havng a temple hinged thereto, a side shield means rigidly attaching said side shield to said temple in a fixed assembled position thereon and against removal by retrograde movement along the temple, said side shield having a longitudinal C-slot thereon having the head portion thereof constructed to accommodate said temple, and rigid detent means on said temple, at least one surface of said slot being yieldable and having a cam latch surface thereon co-operating with said rigid detent for permitting sliding movement of said side shield along said temple in the direction of assembly and preventing retrograde movement of said side shield in the direction of disassembly.

9. In combination with a spectacle frame having a temple hinged thereto, a side shield means rigidly attaching said side shield to said temple in assembled position thereon for movement therewith, locating abutment means rigid with said temple, and means yieldably deflectable on said side shield co-operating with said abutment means to retain said side shield in assembled relation with said abutment on said temple, means providing access under said deflectable means, and means providing a complementary reaction surface spaced from said deflectable means to allow application of a deflecting tool between said reaction surface and said deflectable means via said access for deflection of said deflectable means to permit removal of said side shield from said temple.

10. In combination with a spectacle frame having a temple hinged thereto, a side shield means rigidly attaching said side shield to said temple in assembled position thereon, locating abutment means rigid with said temple, and means yieldably deflectable on said side shield co-operating with said abutment means to retain said side shield in assembled relation with said abutment on said temple, said abutment means comprising the securing means maintaining said temple secure to its respective hinge.

11. In combination with a spectacle frame having a temple hinged thereto, a side shield means rigidly attaching said side shield to said temple in assembled position thereon, locating abutment means rigid with said temple, and means yieldably deflectable on said side shield co-operating with said abutment means to retain said side shield in assembled relation with said abutment on said temple, said abutment means comprising a notch constructed in the respective hinge mounting said temple to said frame.

12. In combination with a spectacle temple, a side shield means providing one-way rigid attachment of said side shield to said temple in assembled position thereon, said means including one-way slidably co-operating abutment means on said temple and side shield retaining said side shield in said assembled position, one of said abutment means being yieldably deflectable to permit assembly with the other said abutment means, means providing access under said yieldable deflectable abutment means, and means providing a complementary reaction surface spaced from said yieldably deflectable abutment means to allow application of a deflecting tool between said reaction surface and said yieldably deflectable abutment means via said access for deflection of said yieldably deflectable abutment means to permit removal of said side shield from said temple.

13. In combination with a spectacle frame having a temple hinged thereto, wherein said temple has a tapered configuration along its length, a side shield having a longitudinal C-slot configuration extending longitudinally thereof having a tapered width conforming substantially to the taper of said temple whereby said side shield may be readily applied to said temple at a longitudinal position thereon in which said tapered C-slot is wider than the temple, said shield having a retaining surface thereon, and positioning abutment means on said temple co-operating with said retaining surface on said side shield, said side shield being connected to said temple by having been slid longitudinally thereof until the retaining surface snapped past said abutment means whereby retrograde disassembly movement of said side shield is prevented.

References Cited

UNITED STATES PATENTS

| | | | |
|---|---|---|---|
| 1,706,682 | 3/1929 | Takacs | 2—3 |
| 1,278,190 | 9/1918 | Martin | 351—149 |
| 2,224,784 | 12/1940 | Goldschmid et al. | 2—13 |
| 2,858,539 | 11/1958 | Carlson | 2—13 |
| 3,165,754 | 1/1965 | Rodgers et al. | 2—13 |
| 2,825,066 | 3/1958 | Chundelak | 2—13 |
| 3,233,249 | 2/1966 | Baratelli et al. | 2—14 |

JAMES R. BOLER, *Primary Examiner.*